Jan. 28, 1936. J. F. McNUTT Re. 19,839

DECALCOMANIA

Original Filed Nov. 30, 1934

Inventor,
James F. McNutt.

By Hull, Brock & West
Atty.

Reissued Jan. 28, 1936

Re. 19,839

UNITED STATES PATENT OFFICE 19,839

DECALCOMANIA

James F. McNutt, Cleveland, Ohio, assignor to The American Decal Corporation, Youngstown, Ohio, a corporation of Ohio Original No. 1,996,549, dated April 2, 1935, Serial No. 755,317, November 30, 1934. Application for reissue November 12, 1935, Serial No. 49,431

8 Claims. (Cl. 41—33)

My invention relates to a new and useful decalcomania and method of making the same, and more particularly to a decalcomania especially adapted for use as a transfer to be applied to glass ware generally, or other glazed or enameled surfaces, whereby the particular design appearing on the decalcomania may be transferred on to the glass, glazed or enameled surface and fused with or burned into such surface to become integral and flush therewith.

My invention still further relates to a decalcomania of this character, the design on which is printed with a specially prepared ink or pigment, which when applied to glass or a similar surface and heated to the proper extent will penetrate the surface of the glass and become permanently fused to and bonded with the body of the glass, the design being thus incorporated in the glass in sharp and clear outlines and being completely unremovable from the glass by either chemical or mechanical actions short of destroying the object thus ornamented.

Figure 1:
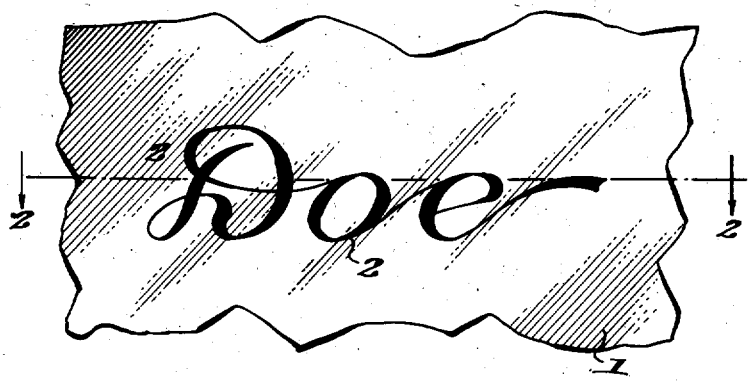
Figure 2:
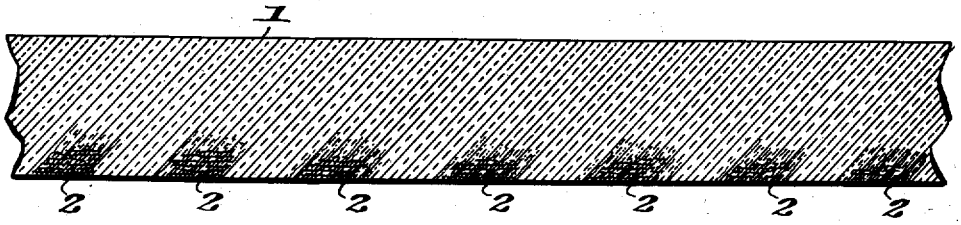
Figure 3:
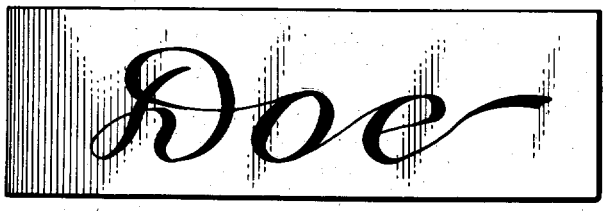

In the accompanying drawing Fig. 1 represents a fragmentary front elevation of an object decorated by means of my novel decalcomania and according to my novel method; Fig. 2 is a cross section on a greatly enlarged scale, illustrating the penetration of the design into and its integration with the body of the bottle and Fig. 3 is a top plan view of my decalcomania before it is applied to the surface to be decorated.

The carrying out of my invention and its practical application involves, generally speaking, three steps:

1. The preparation of the pigment to be used.
2. The preparation of the decalcomania.
3. The application of the decalcomania to the object to be decorated.

*The preparation of the pigment to be used*

Since it is necessary in the interests of permanent adhesion and in order thoroughly to integrate the color of the design to be produced with the object to which it is to be applied, I have found it necessary to develop a pigment or "ink" which is composed of a suitable vehicle, the desired colors or combination of colors, and a vitrifiable base, that is one which is adapted to fuse into and be incorporated with the body of the object to be decorated, carrying the pigment with it, thus permanently fixing the pigmented design in one or more colors on the surface of the object to be decorated. One example of the ingredients and approximate proportions that may be advisably used to produce an "ink" having the desired characteristics is as follows:

Approximately 11 ozs. of opaque or translucent varnish;

Approximately 3 ozs. of color or combination of colors;

Approximately 1 oz. of finely pulverized glass or other silicon base material having a fusing point not higher than but preferably slightly under the fusing point of the glass object to be decorated;

Approximately 1 oz. of any suitable drier.

The foregoing ingredients are thoroughly admixed to produce a homogeneous mass of a uniform consistency.

*The preparation of the decalcomania*

The decalcomania or transfer used in my invention preferably consists of a backing of any suitable inexpensive sheet material, such as paper or the like, which is coated on one side with a film of collodion or similar foundation. The design to be produced is then printed in any suitable manner on the collodion film, and while the design is still wet an additional charge of the dry color or combination of colors used in the preparation of the "ink" is blown or brushed on to the decalcomania or otherwise added to the original impression, thereby increasing the clearness, solidity and uniformity of the impression produced and insuring the appearance of distinct and clear outlines of the design after it is applied to the object to be decorated. The collodion film paper is obtainable on the open market and consists of a paper backing to which a layer of collodion is attached by means of a suitable adhesive.

*The application of the decalcomania to the object to be decorated*

When it is desired to apply the decalcomania to the object to be decorated, the decalcomania prepared as hereinbefore described is then soaked in water for a sufficient period of time to soften it and to facilitate its application to and against the object to be decorated. After the decalcomania has been applied to the surface to be decorated in the proper manner the object is then placed in a kiln or other retort which is suitably heated to raise the temperature to about 1100° F. at which temperature the silicon or glass base of the ink fuses into and becomes integrated with the body of the object to be decorated and carries with it the color used in the preparation of the ink. The collodion base is completely volatilized and consumed when subjected to the heat of the kiln or retort without injury to the design. When the object being decorated is removed from the kiln it will be found that the color of the design originally printed on the decalcomania has become thoroughly integrated with and incorporated into the body of the object in an unremovable manner.

In the accompanying drawing I have attempted to illustrate the invention diagrammatically by showing a fragmentary piece of glass 1 on which the name "Doe" has been applied according to my process in any desired color or combination of colors. In Fig. 2, which is a greatly exaggerated cross sectional view, I have illustrated the manner in which the "ink" of which the letters "Doe" are formed penetrates into the glass 1 as shown at 2 in Fig. 2. In this way the color or colors with which letters are printed thus penetrate the body of the glass object 1 and become thoroughly and permanently integrated therewith, it being impossible to remove the letters thus applied by any means whatsoever without destroying the identity of the object 1. Furthermore, the "ink" of my invention has been found in practice to fuse at about 1100 degrees and thoroughly to merge with the body of the glass to which it is applied, thus making it possible to apply the same to an unlimited variety of glass or glazed surfaces which generally do not melt at 1500 degrees F. It will further be seen that by my novel method I produce an inexpensive "ink" which can be printed in any repeating or nonrepeating design or inscription upon separate decalcomanias or a continuous sheet thereof, which decalcomania when applied to a glass object in the manner above set forth indelibly and unremovably incorporates the design printed thereon into the body of the glass.

Having thus described my invention, what I claim is:

1. A decalcomania for transferring a design onto a glass object or the like comprising a backing strip to which is attached a cellulosic film having a design formed on the exposed surface thereof, said design being formed of vitrifiable material including as one of its components pulverized glass having a fusing point slightly lower than the fusing point of the surface to be decorated.

2. A decalcomania for transferring a design onto a surface comprising a backing strip to which is attached a cellulosic film having a design formed on the exposed surface thereof and including as one of its ingredients a pulverized glass which will fuse at about 1100° F.

3. A decalcomania for decorating fusible surfaces comprising a backing strip to which is detachably secured a layer or film of material having a design secured to the outer surface thereof and containing a pigment and a substance which has a fusing point slightly lower than the fusing point of the surface to be decorated, such layer or film being formed of a homogeneous, non-fibrous material, which may be readily secured to the surface to be decorated and which may be burned away without injuring the design.

4. A decalcomania for decorating fusible surfaces comprising a cellulosic film, a backing strip detachably secured to one surface thereof and a design secured to the other surface thereof and containing a pigment and a substance which has a fusing point slightly lower than the fusing point of the surface to be decorated.

5. A decalcomania for decorating fusible surfaces comprising a film of material having a design secured to one surface thereof and containing a pigment and a substance which has a fusing point slightly lower than the fusing point of the surface to be decorated, a backing strip detachably secured to the other surface of said film, said film being formed of a homogeneous, non-fibrous material which when subjected to heat will be consumed without injury to the design.

6. A decalcomania for transferring a design onto a glass object or the like comprising a backing strip to which is attached a homogeneous non-fibrous material having a design applied to the exposed surface thereof, said design being formed of vitrifiable material including as one of its components pulverized glass having a fusing point slightly lower than the fusing point of the surface to be decorated.

7. A decalcomania for transferring a design onto a surface comprising a backing strip to which is attached a thin, homogeneous, non-fibrous film of material having a design formed on the exposed surface thereof and including as one of its ingredients a vitrifiable material which will fuse at about 1100° F.

8. A decalcomania for transferring a design onto a surface comprising a backing strip to which is attached a thin, homogeneous, non-fibrous film of material having a design formed on the exposed surface thereof and including a pigment and a vitrifiable material which will fuse between 350° C. and 600° C.

JAMES F. McNUTT.